United States Patent

King

[15] 3,643,839
[45] Feb. 22, 1972

[54] FERTILIZER SPREADER MARKING SYSTEM

[72] Inventor: James R. King, 6804 Capstan Drive, Annandale, Va. 22003

[22] Filed: July 9, 1969

[21] Appl. No.: 840,417

[52] U.S. Cl..............................222/177, 222/168, 222/199, 111/32
[51] Int. Cl..........................................A01c 15/00
[58] Field of Search...................222/162, 177, 23, 167, 176, 222/168, 199; 111/28, 30, 32, 33

[56] References Cited

UNITED STATES PATENTS

| | | | |
|---|---|---|---|
| 376,370 | 1/1888 | Craig | 111/32 |
| 947,799 | 2/1910 | Coleman | 111/28 |
| 1,399,677 | 12/1921 | Watson | 111/33 |
| 3,443,727 | 5/1969 | Wellford, Jr. | 222/162 |
| 2,661,956 | 12/1953 | Voss | 222/177 X |

FOREIGN PATENTS OR APPLICATIONS

| | | | |
|---|---|---|---|
| 536,707 | 2/1959 | Belgium | 222/177 |
| 465,777 | 6/1950 | Canada | 222/169 |

Primary Examiner—Stanley H. Tollberg
Assistant Examiner—James M. Slattery
Attorney—Lowe and King

[57] ABSTRACT

A method and apparatus for marking the coverage of a lawn spreader are disclosed wherein one or more spikes are attached to the wheel of said spreader, which spikes serve to lift tufts of thatch to provide the guide lines. The spikes are mounted for radial movement and resiliently biased outwardly to allow retraction for free movement of the wheels over sidewalks or the like. The spikes are carried on an integral hoop having a guide box for each spike and the resilient means is in the form of a spring steel hoop engaging the upper portion of the spikes.

15 Claims, 5 Drawing Figures

INVENTOR,
JAMES R. KING

BY Lowe & King
ATTORNEYS

FERTILIZER SPREADER MARKING SYSTEM

The present invention relates to lawn spreaders for dispensing fertilizer and the like and, more particularly, to a method and apparatus for marking the coverage of such a spreader.

When applying fertilizer to a lawn, especially in the early spring when the grass is still dormant, it is extremely difficult to determine where the fertilizer has been applied. Every homeowner is familiar with the sight of his lawn several weeks later where one strip has been missed and double coverage has been made on another; the lawn having random dark green, overgrown sections and light green, thin sections. To overcome this problem, there have been many proposals for marking the longitudinal path of travel of the fertilizer spreader so that the area covered can be accurately determined. These prior proposals have usually relied upon the concept of spreading of a strip of marking material, such as lime, adjacent the edge of the path being covered, such as in the U.S. Pat. No. 3,114,481, issued to John R. West and dated Dec. 17, 1963. Such systems have left much to be desired in that the operator is required to have a separate supply of lime on hand to replenish the marking reservoirs from time to time. This is, of course, an inconvenience to the operator as well as being time consuming. Also, such a system is very messy in that the lime is likely to be spilled during filling of the small reservoirs, and the lime is left on top of the grass to be blown by the wind and tracked into the house by people who have walked on the lawn. Furthermore, the dispensing of lime is extremely difficult since it tends to compact such that its flow from the reservoirs is hindered, and erratic and hard to follow guide lines are the result.

Accordingly, it is a primary object of the present invention to provide a method and apparatus for marking the path of coverage of a lawn spreader wherein the dispensing of a marking material is not required.

It is another object of the present invention to provide a marking method and apparatus wherein marks are made in the turf which are readily discernible and thus can be followed with ease.

In accordance with the preferred embodiment of the present invention, a plurality of spikes are mounted on the wheel of a lawn spreader. The spikes extend radially beyond the circumference of the wheel and thus down into the turf so as to lift a tuft of thatch as the wheels turn during the operation of the spreader across the ground. The hopper for dispensing the fertilizer is preferably positioned between the wheels, so that the path of coverage of extended width (or swath) of the spreader can be determined for the next pass by observing the imaginery longitudinal line extending through the series of tufts.

The spikes are preferably mounted for radial movement on a circular hoop which is attached to the inside face of the wheel. Resilient means is provided to bias the spikes outwardly so that when a sidewalk or other hard surface is encountered, the spikes retract automatically thereby allowing free movement of the spreader over such obstacles. Preferably, the resilient means takes the form of a spring hoop which is attached to the upper portion of the spikes and which has a selected strength sufficient to penetrate the turf but not the ground. With this feature, the thatch is raised in tufts and the roots of the grass are not damaged to any significant extent.

The movable mounting of the spikes is accomplished through the use of guide boxes on the mounting hoop. With this arrangement, the pulling on the spike by the turf as said spike is lifted at an angle to the vertical plane is successfully resisted, and other forces, such as encountered during turning of the spreader, are successfully handled. The mounting hoop is attached to the face of the wheel by mounting tabs attached to the reinforced areas of said hoop at the guide boxes.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

Figure 1:
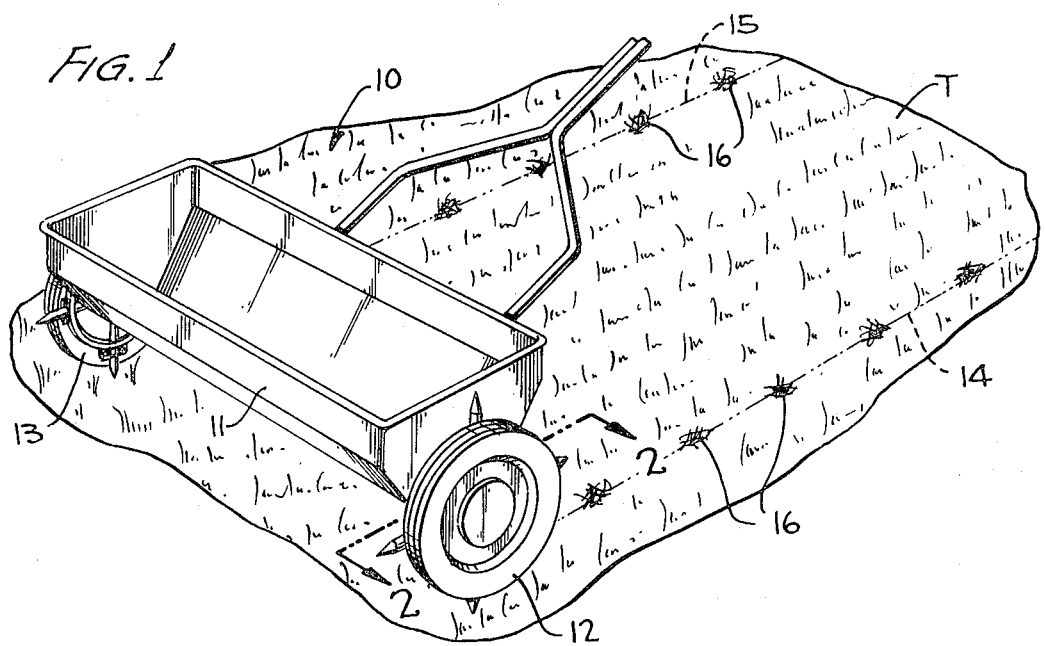
FIG. 1 is a perspective view of a fertilizer spreader with the marking attachment of the present invention applied to both wheels and showing the marking operation along a section of turf.
Figure 4:
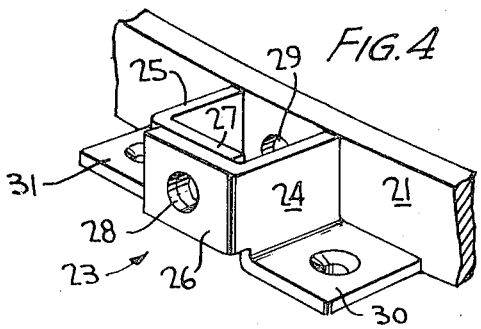
Figure 5:
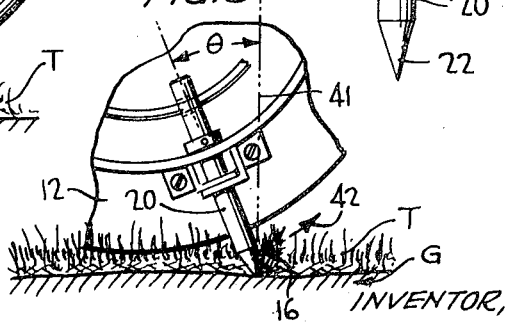

FIG. 4 is a detailed perspective view of the guide boxes for mounting the spikes; and FIG. 5 is a detailed view of the manner in which the spike is operative to lift a tuft of thatch to make a mark. Referring to FIG. 1 of the drawing for a more specific detailed description of the present invention, there has been shown a conventional fertilizer spreader, generally designated by the reference numeral 10, having a hopper 11 disposed between two support wheels 12, 13. As shown in this figure, the spreader 10 is moving along a section of turf T with a path being indicated by imaginery lines 14, 15 extending through tufts or marks 16. The tufts 16 are caused by raised or disturbed areas of thatch (see FIG. 2), which, as is well known, is the dead grass left at the base of the blades of grass by previous mowing. The tufts 16 and thus the guide lines 14, 15 are, as shown, formed by marking attachment 18 attached to the inside face of each of the wheels 12, 13, respectively. Since the hopper 11 is between the wheels 12, 13, the lines 14, 15 accurately portray the longitudinal path of coverage of the fertilizer being dispensed.

Figure 2:
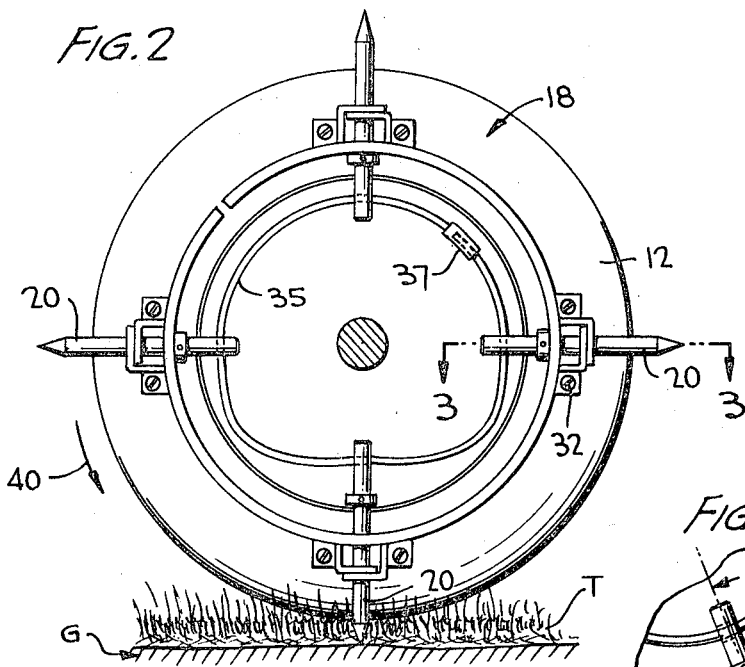
FIG. 2 is a cross-sectional view taken along line 2—2 of FIG. 1 showing the marking attachment mounted on the inside face of the wheel of the fertilizer spreader.
Figure 3:
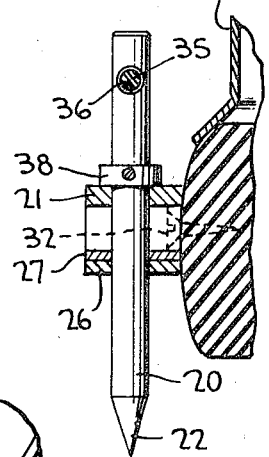
FIG. 3 is a cross-sectional view taken along line 3—3 of FIG. 2 showing the guide box mounting arrangement for the spikes.

As best shown in FIG. 2, the marking attachment 18 of the present invention comprises a plurality of spikes 20 disposed at 90° intervals around the wheel 12 on a mounting hoop 21, which extends outwardly from the inside face of the wheel 12 (see FIG. 3). It should be pointed out at this point, that any number of the spikes 20 (including one) can be utilized in accordance with the present invention, since the rotation of the wheels 12, 13 will make the series of tufts 16 as desired, by repeatedly bringing the spike 20 back into engagement with turf T as the spreader 10 moves along the ground.

The spike 20 may have a hardened tip 22 to prevent wear of the same due to engagement with concrete sidewalks, driveways or the like. The spike 20 must be mounted to resist lateral movement so as to withstand the forces caused by engagement with the turf T. This is accomplished by a guide box, generally designated by the reference numeral 23 (see FIG. 4), formed by a section of the hoop 21, opposed plates 24, 25 extending radially outward from the hoop 21, and bent overlapping tabs 26, 27. Each box 23 provides a two-point guide channel in the form of an extended guide aperture 28 formed through the tabs 26, 27 and an aligned guide hole 29 formed in the hoop 21. The spike 20 is thus mounted for movement in a radial direction with respect to the wheel 12 so that said spike 20 can retract toward the center when brought into engagement with the sidewalk or the like, or to a more limited extent when in engagement with the ground, as will be seen more in detail later.

The plates 24, 25 have bent mounting tabs 30, 31 which serve to mount the attachment 18 on the wheel 12 by means of suitable screws 32 (see FIGS. 2 and 3). In the standard fertilizer spreader, the screws 32 can extend directly into the solid molded rubber tire of the wheel 12, as shown in FIG. 3. The guide boxes 23 can be welded to the mounting hoop 21 as shown in FIG. 2, or if desired, made integral with said hoop 21 in which case there would be a bend between the tabs 30, 31 and the rear edge of the hoop 21 and a weldment only along the connection between the plates 24, 25 and said hoop 21.

The spikes 20 are resiliently biased outwardly by means of a spring steel hoop 35 which engages the upper part of said spikes 20 through suitable apertures 36, as shown in FIG. 3. The spring hoop 35 is during installation threaded through the apertures 36 with the hoop being made endless by a detachable tubular connector 35 (FIG. 2). The outward movement of the spike 20 is limited by a collar 38 (FIG. 3) which cooperates with the hoop 21.

During operation, as the wheel 12 turns (note arrow 40 in FIG. 2) the spike 20 is brought into engagement with the turf T by distortion of the spring hoop 35 so as to engage the thatch at the base of the blades of grass. As the wheel 40 continues to roll and move forwardly, the spike 20 is continuously urged outwardly by the spring hoop 35 until the collar 38 engages the mounting hoop 21. At this point, the spike 20 is at an acute angle $\theta$ to a vertical plane 41, as illustrated in FIG. 5. Because the tip 22 of the spike 20 has been allowed to scrape up and extend under a portion of the thatch, a hold is gained on said thatch whereupon continued forward movement of the wheel 12 and upward movement of the spike 20 (as indicated by arrow 42) causes the formation of the raised tuft 16.

The resiliency of the spring hoop 35 is selected so that the tip 22 does not normally penetrate into the ground beneath the turf T so that said tip will slide along the ground from the vertical position (FIG. 2) to the angled position (FIG. 5) whereby the tuft 16 is collected and made visible. In these instances, particularly where the ground is soft after a rain, for example, a small amount of roots and soil of the turf T may be raised with the tuft 16. Such a small indentation is however, not deleterious to the grass roots.

If desired, the spring hoop 35 can be selected so as to fit the particular conditions in which the marking attachment 18 is to be used. For example, if the turf is on ground of soft sand then a spring hoop 35 of less resiliency can be selected in order to prevent too deep penetration of the ground.

After the fertilizing operation has been completed, the tufts 16 are readily dissipated by the next mowing operation or rain by moving back down into the underlying thatch and leaving a completely unmarked lawn that has been fertilized evenly. An incidental advantage of clearing small areas of thatch, as shown in FIG. 5, is to aerate the turf whereby air and water can reach the grass roots more readily at uniformly spaced intervals.

Various modifications are contemplated within the scope of this invention, if the conditions so dictate. The head of the spike 22 may be flat transverse to the direction of travel of the spreader 10, i.e., like a chisel, so that a wider swath of thatch is lifted for marking. A resilient wiper may be positioned adjacent the periphery of the wheel 12 to dislodge the tufts 16 which might tend to stick on the spike 20. If the thatch is particularly thin, it may be desirable to include a gripper on the spike 20 to grasp the thatch for lifting. The gripper can be operated closed in response to the distortion of the spring hoop 35 (FIG. 2) and opened for release of the tuft 16 as the hoop 35 returns to normal.

The resiliency of the spring hoop 35 can be made adjustable at the connector 37 by making the tubular connector 37 rotatable and with internal threads to mate with external threads on the mating end of the hoop 35. As the end is screwed into the connector 37 the hoop 35 becomes smaller and thus asserts less outward resilient force as the spike 20 engages the ground. If greater force is desired the connector 37 is turned in the opposite direction whereupon the spikes 20 are extended as far as possible and the distortion in the hoop 35 increased to increase the downward force of said spikes 20. Similarly, the collars 38 may be adjustable along the spike 20 to vary the operative resiliency resulting from the hoop 35.

Also, adjustment can be effected by providing additional hoops of different resiliencies for replacement of the hoop 35. The hoops may be made permanently endless if a slot is provided in the top of each spike 20 in lieu of the aperture 36 so that each hoop can be easily installed by slipping into three of the four slots, with distortion (see FIG. 2) allowing placement in the final one.

Marks in addition to lifted tufts of thatch aid in the operation of the method and device of this invention. More specifically, the exact nature of the marks may vary slightly in accordance with the condition of the turf T. In turf which is extremely thin, the marks to be followed may take the form of spots where the spikes 20 have scratched the ground; i.e., a dark spot where the lighter thatch has been removed. On the other hand, where the grass is relatively thick and tall, the marks are enhanced by the tendency of the grass to be matted down by the wheels 12, 13 of the spreader 10. That is, with the spikes 20 operating in juxtaposition with the inside face of said wheels 12, 13, the thatch and grass blades are raised at spaced points to maximum height, and the difference or contrast between the raised points and the adjacent matted grass generates easily discernible marks thereby defining the longitudinal lines 14, 15.

The present invention thus provides a simple marking attachment 18 which performs its function of providing lines 14, 15 without the use of any marking material. The apparatus and method can be used successfully on lawns since the resilient mounting of the spikes 20 allows the spreader 10 to be operated over sidewalks and driveways without hindrance. Furthermore, the resiliency feature provides a selective penetration of the turf T whereupon the tuft 16 is the only part of the turf T disturbed.

In this disclosure, there is shown and described only the preferred embodiment of the invention, but, as aforementioned, it is to be understood that the invention is capable of various changes or modifications within the scope of the inventive concept as expressed herein.

I claim:

1. A method of marking and using the longitudinal path of coverage of extended width of a lawn spreader in an established lawn with a layer of thatch in the turf comprising the steps of periodically projecting a spike from the spreader into the turf through the layer of thatch so as to at least partially penetrate the turf during the operation of the spreader across the ground, moving the tip of said spike in the plane defined by the thatch during penetration, lifting said spike from said turf such that at least tufts of thatch from the turf are raised to indicate said path for guiding of the spreader on the next pass to give uniform coverage, and utilizing said mark on the next pass to guide the spreader longitudinally.

2. The method of claim 1 wherein a spike is intermittently projected into said turf and said thatch is lifted in tufts by said spike to form said line.

3. The method of claim 1 wherein said spike is projected with just sufficient strength to penetrate the turf but not the ground and is moved in a circle and adjacent the edge of said path whereby said projecting and lifting steps are repeated.

4. The method of claim 3 wherein said spikes are raised at an angle to a vertical plane.

5. A marking device for a lawn spreader to be used to dispense material to the turf on the ground along a longitudinal path of extended width in an established lawn with a layer of thatch, said spreader having a hopper for said material and at least one support wheel, comprising at least one nonsupporting spike mounted adjacent said wheel and extending substantially radially thereof, said spike extending sufficiently beyond the circumference of said wheel to engage said turf, mounting means for said spike having sufficient strength to cause at least partial penetration of said turf through the thatch, means for causing movement of the tip of said spike in the plane defined by said thatch during penetration to raise at least a tuft of thatch therefrom, whereby the path of travel of said spreader is marked for guiding of the spreader on the next pass to give uniform coverage.

6. The device of claim 5 wherein is provided a plurality of spikes spaced around said wheel.

7. The device of claim 5 wherein said mounting means comprises guide means for mounting said spike for radial movement, resilient means for biasing said spike radially outwardly only sufficient to penetrate turf, whereby said spike is retracted when the ground and a hard surface is encountered.

8. The device of claim 7 wherein said resilient means has just sufficient strength to penetrate the turf but not the ground, whereby only turf is raised for marking.

9. The device of claim 5 wherein is provided a plurality of spikes spaced around said wheel, a mounting hoop for said spikes extending around the face of said wheel, and guide means on said hoop for mounting said spikes for radial movement.

10. The device of claim 9 wherein said guide means includes a plurality of stabilizer boxes, each of said spikes extending through one of said boxes.

11. The device of claim 10 wherein said boxes include opposed plates extending radially outwardly from said hoop, said plates having overlapping tabs extending laterally with respect to said spikes, guide apertures in said tabs and corresponding guide apertures in said hoop.

12. The device of claim 10 wherein is further provided mounting tabs for said hoop attached to said boxes.

13. The device of claim 9 wherein is provided a spring hoop engaging the upper portion of each of said spikes to bias the same radially outwardly.

14. The device of claim 13 wherein said spring hoop includes detachable fastening means for making the same endless.

15. The device of claim 13 wherein said spring hoop has sufficient resiliency to project each spike in turn into said turf but insufficient resiliency to project the same into the ground.

* * * * *